UNITED STATES PATENT OFFICE.

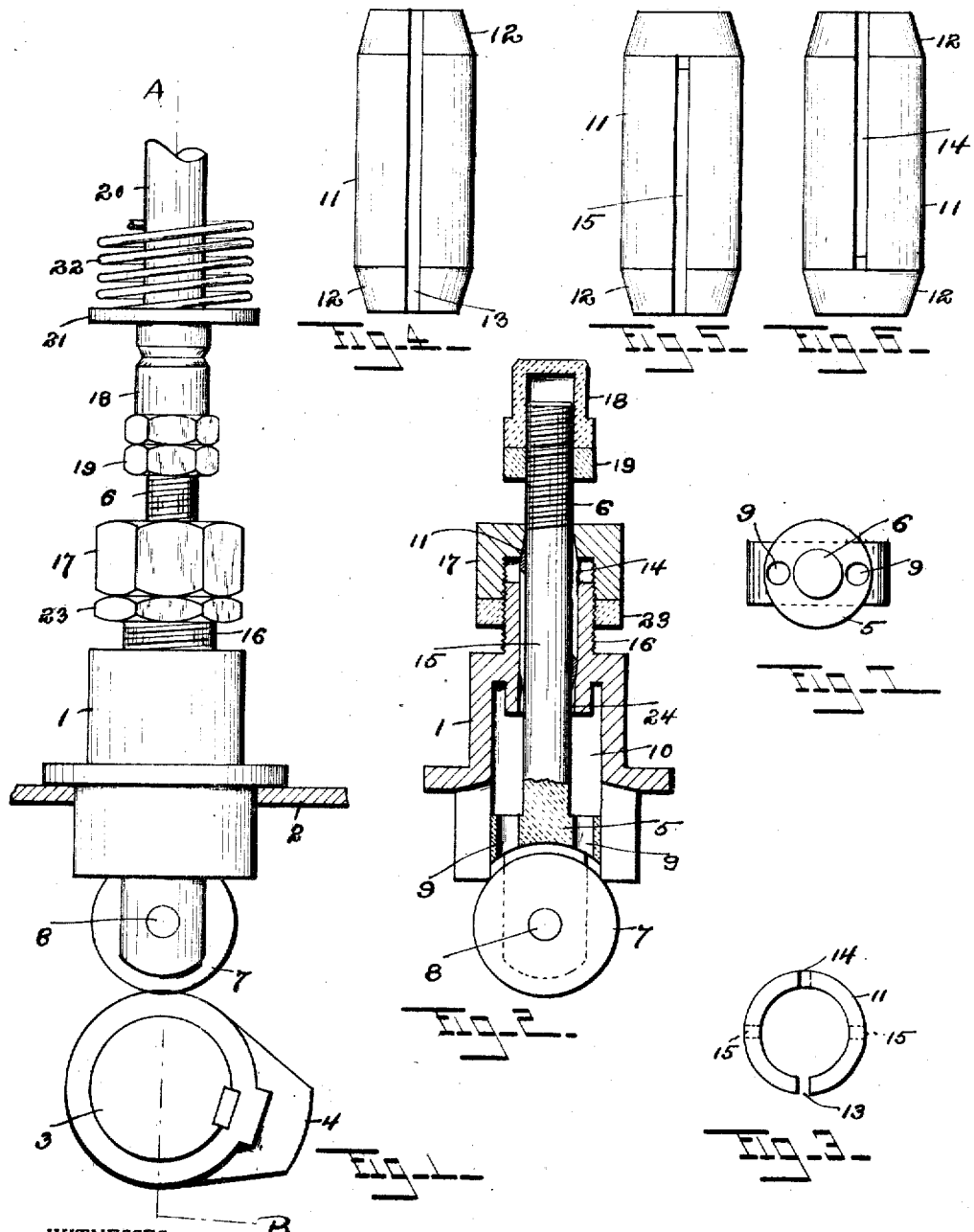

HENRY F. ODENKIRCHEN, OF NEW HAVEN, CONNECTICUT.

VALVE-PUSH-ROD MECHANISM.

No. 908,604.   Specification of Letters Patent.   Patented Jan. 5, 1909.

Application filed July 7, 1908. Serial No. 442,379.

*To all whom it may concern:*

Be it known that I, HENRY F. ODENKIRCHEN, a citizen of the United States, residing at New Haven, in the county of New Haven and State of Connecticut, have invented certain new and useful Improvements in Valve-Push-Rod Mechanism, of which the following is a specification, reference being had therein to the accompanying drawings.

My invention relates to new and useful improvements in valve push rod mechanism, having more particular reference to that type of such mechanism used upon motor vehicles, and has for its object, among other things, to provide a simple and economical device of this character having adjustable and self-lubricating bearings.

To these, and other ends, my invention consists in the valve push rod mechanism, having certain details of construction and combinations of parts, as will be hereinafter described, and more particularly pointed out in the claims.

Referring to the drawings, in which like numerals of reference designate like parts in the several figures; Figure 1 is a side elevation of my device complete with a view of the cam shaft, and a portion of the valve stem; Fig. 2 is a sectional elevation thereof upon a line at a right angle to line A—B of Fig. 1: Fig. 3 is an end view of the sleeve; Fig. 4 is a side view thereof looking from the underside of Fig. 3; Fig. 5 is a similar view looking toward the left of Fig. 3; Fig. 6 is a similar view looking toward the top side of Fig. 3; and Fig. 7 is an end view of the push rod.

Heretofore it has been usual for the valve push rod to be mounted in a non-adjustable bearing, which rapidly becomes worn to such a degree as to be practically valueless. This difficulty is considerably enhanced by reason of the fact that the valve mechanism is usually concealed under the body of the vehicle and hence oiled only with difficulty, and in practice, is practically never oiled. In my invention these difficulties are overcome by mounting the push rod in an adjustable bearing, so designed and arranged that a constant supply of lubricating oil is maintained in contact therewith, this oil reducing the wear to a minimum, which is taken up occasionally through the adjustable bearing just described.

In the practice of my invention I provide a body member 1, which is secured by any desired means to a casing 2, within which is rotatable the cam shaft 3 having the cam 4 thereon, and containing a supply of lubricating oil. Axially movable in said body member is the push rod having a head portion 5 with a shank 6 integral therewith, said head being split lengthwise, and within which is mounted the roll 7 secured thereto by the pin 8, said roll normally lying in contact with the periphery of the cam 4. Through the head 5 parallel with the shank 6 are the holes 9—9 which open into the chamber 10 in said body member. Within the other end of the body member 1 is a sleeve 11 having conical ends 12 and upon one side split throughout its whole length by the slot 13. Diametrically opposite said slot is another slot 14 which extends from one end of said sleeve to a point adjacent to the other end thereof, as shown in Fig. 6, and extending through said sleeve at a point 90° upon both sides of said slots 13 and 14 are two similar slots 15, which extend from the end of the cylinder opposite to the end where the slots 14 begin, and terminate at a point near the opposite end of said cylinder, as shown in Fig. 5.

Encircling the shank of the push rod, and threaded onto the hub 16 of the body 1, is the nut 17, the underside of which is engaged by the jam nut 23. The bore in the body member 1, within which the sleeve 11 is fitted, is conical at its bottom, as is also the inside of the nut 17, so that by rotation of the nut 17 upon the hub 16 in one direction, compresses the sleeve 11 and allows it to expand if moved in the other direction.

Threaded upon the push rod 6 is the tip 18 which is held in any of its adjustable positions by the jam nut 19 and contacts with the lower end of the valve rod 20 that is usually provided with a collar 21 and held in contact with the tip 18 by the spring 22.

Motion is imparted to the push rod within the body member through the spring 22 and the cam 4, which cam is continually rotating in oil as is also the head 5 and roll 7. The reciprocating movement of the head 5 forces oil through the openings 9 therein and into the chamber 10, from which it passes through the bore 24, of slightly larger diameter than the shaft 6, into the slots 13 and 15 of the sleeve 11. Some of the oil passes through the slot 13 into the chamber between the top of the hub 16 and nut 17 and into the slot 14. By this method of distributing oil the bearing for the push rod is oiled at all times, the head 5 acting as a pump to keep the oil in circulation. The sleeve, slotted as herein shown and described, is uniformly compressed throughout its length by the rotation of the nut 17, thus making an adjustable bearing with ample provision to keep it well lubricated at all times.

My device is practically indestructible, because the bearing being continually oiled will wear indefinitely, and can be adjusted to take up such slight wear as may occur, and if necessary may be replaced by a new sleeve at a nominal expense.

There are minor changes and alterations that can be made within my invention, and I would therefore have it understood that I do not limit myself to the exact construction herein shown and described, but claim all that falls fairly within the spirit and scope of my invention.

Having described my invention, what I claim as new and desire to secure by Letters Patent, is:—

1. In mechanism of the character described, the combination with a body member having an oil chamber therein; of a slotted sleeve within said body member; a nut engaging said sleeve so as to compress the same by its rotation in one direction; a push rod movable within said sleeve and passing through said oil chamber; and means for providing a continuous supply of oil, from said oil chamber to the bearing within said sleeve.

2. In mechanism of the character described, the combination with a body member having an oil chamber therein; of a slotted sleeve mounted therein so as to be connected by a passage with said oil chamber; a nut threaded on said body member and having contact with one end of said sleeve; a push rod slidably mounted in said sleeve and passing through said oil chamber; and a roll mounted on said push rod and contacting with the means for reciprocating said push rod.

3. In mechanism of the character described, the combination with a body member having an oil chamber therein; of a slotted sleeve mounted therein; a nut threaded on said body member and having contact with one end of said sleeve; and a push rod slidably mounted in said sleeve, passing through said oil chamber and having a head thereon with openings through which oil enters said oil chamber.

4. In mechanism of the character described, the combination with a body member; of a sleeve having one slot therein extending from end to end and companion slots extending from one end to a point adjacent to the other end; a nut engaging said sleeve so as to compress the same by its rotation in one direction; and a push rod slidably mounted in said sleeve.

5. In mechanism of the character described, the combination with the body member having an oil chamber therein; of the sleeve 11 having conical ends 12 and slotted substantially as described; a nut 17 threaded upon said body member and engaging said sleeve; and the push rod 6 having a head 5 thereon with the openings 9 therethrough.

In testimony whereof I affix my signature in presence of two witnesses.

HENRY F. ODENKIRCHEN.

Witnesses:
GEORGE E. HALL,
J. P. DEJON.